(12) United States Patent
Pishehvari et al.

(10) Patent No.: US 11,977,159 B2
(45) Date of Patent: May 7, 2024

(54) METHOD FOR DETERMINING A POSITION OF A VEHICLE

(71) Applicant: Aptiv Technologies AG, Schaffhausen (CH)

(72) Inventors: Ahmad Pishehvari, Wuppertal (DE); Uri Iurgel, Wuppertal (DE); Markus Stefer, Remscheid (DE); Konstantin Statnikov, Düsseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 767 days.

(21) Appl. No.: 17/087,560

(22) Filed: Nov. 2, 2020

(65) Prior Publication Data
US 2021/0141091 A1     May 13, 2021

(30) Foreign Application Priority Data
Nov. 7, 2019 (EP) ..................................... 19207813

(51) Int. Cl.
*G01S 17/86* (2020.01)
*G01S 7/484* (2006.01)
(Continued)

(52) U.S. Cl.
CPC .............. *G01S 17/86* (2020.01); *G01S 7/484* (2013.01); *G01S 7/497* (2013.01); *G01S 17/46* (2013.01); *G01S 17/89* (2013.01)

(58) Field of Classification Search
None
See application file for complete search history.

(56) References Cited

U.S. PATENT DOCUMENTS 5,181,254 A * 1/1993 Schweizer ............. G06V 10/44
382/280
8,558,733 B2 10/2013 Kamo et al.
(Continued)

FOREIGN PATENT DOCUMENTS

CN     111366164     7/2020
DE     10148062     4/2003
(Continued)

OTHER PUBLICATIONS

"Non-Final Office Action", U.S. Appl. No. 16/241,404, filed Nov. 17, 2021, 23 pages.
(Continued)

*Primary Examiner* — Hovhannes Baghdasaryan

(57) ABSTRACT

A computer-implemented method for determining a position of a vehicle is disclosed, wherein the vehicle is equipped with a sensor for capturing scans of a vicinity of the vehicle, wherein the method comprises at least the following steps carried out by computer-hardware components: capturing at least one scan by means of the sensor with a plurality of sensor data samples given in a sensor data representation; determining, from a database, a predefined map with at least one element is given in a map data representation; determining a transformed map by transforming the at least one element of the predefined map from the map data representation into the sensor data representation; matching at least a subset of the sensor data samples of the at least one scan and the at least one element of the transformed map; and determining the position of the vehicle based on the matching.

20 Claims, 7 Drawing Sheets

Figure 1:
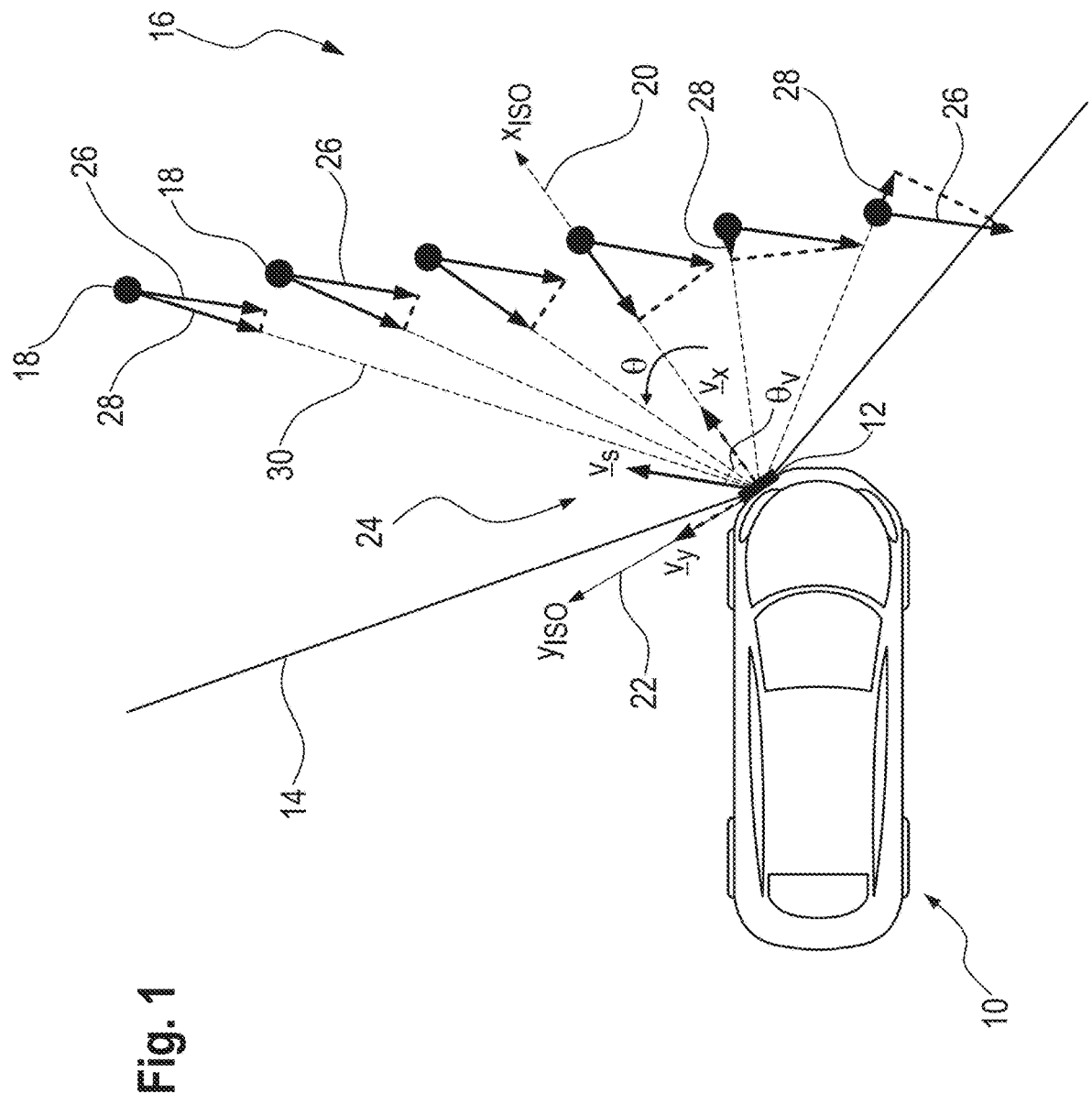

(51) Int. Cl.
*G01S 7/497* (2006.01)
*G01S 17/46* (2006.01)
*G01S 17/89* (2020.01)

(56) References Cited

U.S. PATENT DOCUMENTS

| | | | |
|---|---|---|---|
| 8,633,849 | B2 | 1/2014 | Shibata et al. |
| 9,041,588 | B2 | 5/2015 | Yasugi et al. |
| 9,199,643 | B1 | 12/2015 | Zeng |
| 9,618,608 | B2 | 4/2017 | Mizutani et al. |
| 11,378,653 | B2 * | 7/2022 | Pishehvari .............. G01S 7/487 |
| 2005/0259002 | A1 | 11/2005 | Erario et al. |
| 2014/0043185 | A1 | 2/2014 | Quellec et al. |
| 2015/0022392 | A1 | 1/2015 | Hegemann et al. |
| 2016/0139255 | A1 | 5/2016 | Bueschenfeld et al. |
| 2018/0067491 | A1 | 3/2018 | Oder et al. |
| 2018/0136332 | A1 * | 5/2018 | Barfield, Jr. ....... G06V 10/7784 |
| 2019/0114798 | A1 * | 4/2019 | Afrouzi .................. H04N 23/00 |
| 2019/0227145 | A1 | 7/2019 | Pishehvari et al. |
| 2020/0217943 | A1 * | 7/2020 | Pishehvari .......... B60W 40/105 |
| 2021/0164800 | A1 | 6/2021 | Lessmann et al. |
| 2021/0213962 | A1 | 7/2021 | Pishehvari et al. |
| 2021/0396862 | A9 | 12/2021 | Pishehvari et al. |

FOREIGN PATENT DOCUMENTS

| | | |
|---|---|---|
| DE | 102016205227 | 10/2017 |
| DE | 102016214030 | 2/2018 |
| EP | 1584520 | 10/2005 |
| EP | 3517996 | 7/2019 |
| WO | 2011023244 | 3/2011 |

OTHER PUBLICATIONS

"Extended European Search Report", EP Application No. 18153439.7, dated Sep. 12, 2018, 14 pages.

"Foreign Office Action", EP Application No. 1853439.7, dated Jul. 14, 2020, 5 pages.

"Foreign Office Action", EP Application No. 18153439.7, dated Dec. 4, 2020, 5 pages.

Kirchner, et al., "Der Laserscanner ALS Intelligenter KZF-Sensor", Jan. 1, 1998, pp. 26-32, 34.

Pishehvari, et al., "Ego-pose estimation via Radar and Openstreetmap-based Scan matching", May 2018, 8 pages.

Streller, et al., "Object Tracking in Traffic Scenes with Multi-Hypothesis Approach Using Laser Range Images", Sep. 30, 2001, 8 pages.

"Extended European Search Report", EP Application No. 20151644.0, dated May 29, 2020, 15 pages.

"Extended European Search Report", European Application No. 19212492.3, dated Jun. 2, 2020, 14 pages.

Besl, et al., "A Method for Registration of 3-D Shapes", Feb. 1992, pp. 239-255.

Biber, "The Normal Distributions Transform: A New Approach to Laser Scan Matching", Nov. 2003, 6 pages.

Borenstein, et al., "Correction of Systematic Odometry Errors in Mobile Robots", Aug. 1995, pp. 569-574.

Bosse, et al., "Histogram Matching and Global Initialization for Laser-only SLAM in Large Unstructured Environments", Apr. 2007, pp. 4820-4826.

Burnikel, et al., "How to Compute the Voronoi Diagram of Line Segments: Theoretical and Experimental Results", Max Planck Institute for Informatics, DOI: 10.1007/BFb0049411, Apr. 2006, 14 pages.

Censi, "An ICP Variant Using a Point-to-line Metric", Jun. 2008, 7 pages.

Censi, et al., "Scan Matching in the Hough Domain", Jan. 2005, 6 pages.

Checchin, et al., "Radar Scan Matching SLAM using the Fourier-Mellin Transform", Jan. 2009, 10 pages.

Cole, et al., "Using Laser Range Data for 3D SLAM in Outdoor Environments", Jun. 2006, 9 pages.

Diosi, et al., "Laser Scan Matching in Polar Coordinates with Application to SLAM", Sep. 2005, 6 pages.

Haklay, et al., "OpenStreetMap: User-Generated Street Maps", Oct. 2008, pp. 12-18.

Levinson, et al., "Robust Vehicle Localization in Urban Environments Using Probabilistic Maps", Jun. 2010, 7 pages.

Lingermann, et al., "Indoor and Outdoor Localization for Fast Mobile Robots", Jan. 2004, 6 pages.

Lu, "Robot Pose Estimation in Unknown Environments by Matching 2D Range Scans", Nov. 1997, pp. 249-275.

Minguez, et al., "Metric-Based Iterative Closest Point Scan Matching for Sensor Displacement Estimation", Nov. 2006, 7 pages.

Nister, et al., "Visual Odometry", Jul. 2004, 8 pages.

Pishehvari, et al., "Robust Range-Doppler Registration with HD Maps", Apr. 2020, 9 pages.

Schwertfeger, et al., "Map Evaluation Using Matched Topology Graphs", Sep. 2015, 27 pages.

"Extended European Search Report", EP Application No. 19207813.7, dated May 29, 2020, 15 pages.

* cited by examiner

METHOD FOR DETERMINING A POSITION OF A VEHICLE

CROSS-REFERENCE TO RELATED APPLICATION

This application claims priority to European Patent Application Number 19207813.7, filed Nov. 7, 2019, the disclosure of which is hereby incorporated by reference in its entirety herein.

FIELD

The present disclosure relates to a computer-implemented method for determining a position of a vehicle.

BACKGROUND

Vehicles known from the state of the art are capable of determining their current position on the basis of at least one sensor mounted on the vehicle. For example, many vehicles comprise a global-positioning system (GPS) from which the position of the vehicle can be inferred with a fair degree of accuracy. The determination of the position by means of a GPS requires a radio signal from the satellite space, which is, however, not always readily available. For example, the required GPS-signal can be very weak so that a relatively long time span is necessary in order to evaluate the position from the signal. Sometimes, the signal is too weak in order to securely determine the position. In other circumstances, there is even no signal available, for example, in fully or partially enclosed vicinities, such as road tunnels and buildings, in particular subterranean garages. Therefore, no position can be determined at all. As another problem, the accuracy of GPS is sometimes not sufficient, for example for autonomous-driving applications.

Modern vehicles, for example upper-class cars, are equipped with radar and/or LiDAR (light detection and ranging) systems. Corresponding measurements, i.e. scans, alone can be insufficient for determining the position with a desired reliability and accuracy. The same problem occurs with one or more motion sensors mounted on the vehicle. In particular, various measurement methods, e.g., odometry (dead reckoning) are alone not suitable for determining the position with the desired reliability. Additionally, using radar sensors or comparable sensor technology requires significant processing resources, for example due to determining radar detection points from the raw sensor data. The raw sensor data is usually given as sensor data samples with a radial distance component and a rate of change of the distance (velocity in the radial distance direction). Such sensor data can be denoted as Doppler-sensor data.

Accordingly, there is a need to provide an improved method for determining the position of a vehicle.

SUMMARY

The present disclosure provides a computer-implemented method, a computer system and a non-transitory computer readable medium according to the independent claims. Embodiments are given in the subclaims, the description and the drawings.

In one aspect, the present disclosure is directed at a computer-implemented method for determining a position of a vehicle, wherein the vehicle is equipped with at least one sensor for capturing scans of a vicinity of the vehicle, wherein the method comprises at least the following steps carried out by computer-hardware components: capturing at least one scan by means of the at least one sensor, wherein the at least one scan represents the vicinity of the vehicle and comprises a plurality of sensor data samples given in a sensor data representation, wherein the sensor data representation comprises a first component and a second component, the first component representing a distance between the sensor and the vicinity of the vehicle, and the second component representing a rate of change of the distance between the sensor and the vicinity of the vehicle; determining, from a database, a predefined map, wherein the predefined map represents the vicinity of the vehicle and comprises at least one element representing a static landmark, wherein the at least one element is given in a map data representation comprising a plurality of coordinates, wherein the coordinates represent position information of the static landmark; determining a transformed map by transforming the at least one element of the predefined map from the map data representation into the sensor data representation; matching at least a subset of the sensor data samples of the at least one scan and the at least one element of the transformed map; and determining the position of the vehicle based on the matching.

It has been found that sensor measurements, for example radar measurements, are in principle well suited for robust measurement of the vicinity of a vehicle. However, determining the position of the vehicle on the basis of radar scans can require significant processing efforts. This is because a radar scan usually comprises a plethora of sensor data samples from which only a portion represent useful measurements, e.g., due to noise. Furthermore, the sensor data samples are not provided in a full spatial representation like a Cartesian coordinate system. In particular, the sensor data samples are given with said first component (distance) and second component (rate of change of distance), which is only a partial spatial representation. In order to obtain a full spatial representation, radar detection points (also called point cloud) could be determined from the sensor data samples, which involves processing (e.g., peak finding, angle estimation, transformation from Polar to Cartesian coordinates). The detection points could then be used for matching because map data and detection points would then both be provided in a full spatial representation, e.g. Cartesian coordinates. For example, the detection points can comprise full spatial information relative to the underlying vehicle.

As a different approach it is proposed herein to avoid determining detection points or point clouds with full spatial representation, i.e. with at least two spatial coordinates. Instead, it is suggested to directly use the sensor data samples and to perform the matching on the basis of the sensor data samples and the one or more elements of the predefined map. This step is carried out in the sensor data representation. Accordingly, processing effort is significantly reduced, while the position of the vehicle can still be determined with a high degree of accuracy and reliability.

Having regard to the matching, it is proposed to make use of ground-truth data, which represents the vicinity of the vehicle. This ground-truth data is provided in form of a database, which comprises map data that preferably represents a geo-structural model. The map data describes the vicinity of a desired driving area, which preferably comprises characteristic objects, i.e. static landmarks, which can limit a desired driving area of a vehicle. Examples for such landmarks are traffic signs, poles, street lamps, walls, fences but also substantial pavement edges and bigger plants, e.g., trees and the like. Although such objects will usually limit a driving area, the map data is not limited thereto. This is to say that the map data can also comprise landmarks, which are not directly relevant for defining an allowable driving space. In principle, the map data can comprise descriptions of those objects which will be sensed by the sensor in its vicinity.

The map data stored in the database comprises representations of static landmarks in form of so-called elements. These elements are of mathematical nature and are preferably simplified objects, as will be explained in greater detail below. In particular, each of the elements comprises information about its global position, i.e. in a world coordinate system, which can be a Cartesian coordinate system. In contrast, sensor data samples acquired by means of a sensor, e.g. radar system of a vehicle, only comprise two components, which represent a relative distance between the vicinity and the sensor and the rate of change of the distance (velocity). This forms at least a part of the sensor data representation.

The map data in the database can comprise map data, which captures a desired driving area, for example all valid driving areas in a given country or a group of different countries. From this map data a predefined map is determined, wherein the predefined map can be limited to a current vicinity of the vehicle. This current vicinity can be limited to a specified range of the sensor so that the predefined map includes only those elements within the range, i.e., those objects which are potentially hit by the sensor signals emitted from the sensor. Therefore, the step of determining the predefined map comprises identifying a portion of the map which corresponds to a current "view" of the sensor, thereby providing a geo-structural description of the local vicinity of the vehicle at a given time instant. The predefined map can be determined on the basis of position information derived from a current GPS-signal received at the vehicle. If such a signal is currently not available the last GPS-signal or another position estimate may be used, in particular from one or more motion sensors of the vehicle. It is understood that the validity of the predefined map as ground truth depends on the validity of the position information that is used for determining the current map. If a position estimate from one or more motion sensors of the vehicle is used (odometry), the predefined map can be regarded as an inaccurate estimation, wherein the sensor data samples are regarded as ground truth. The matching can then be used to find an improved position estimate.

Each of the plurality of elements of the predefined map represents a static landmark in the vicinity of the vehicle. The predefined map can be a navigation map, in particular a navigation map from a publicly available database, e.g. open-street map. The predefined map can be derived from a global database on the basis of a given position of the vehicle, e.g. from a global position system of the vehicle or by using odometry, as indicated above. The static landmarks can be static objects, e.g. poles, walls of buildings or other barriers for the vehicle which form objects detectable by the sensor system of the vehicle. The map can be a so called High-Definition (HD) map in which the elements are provided with highly precise position information.

The predefined map, i.e. the at least one element thereof, is matched with at least a subset of the plurality of sensor data samples. The plurality of sensor data samples are acquired by means of one or more scans, wherein in the latter case, the scans are preferably successive scans. Preferably, the sensor data samples correspond to a substantially common time instant, which may also be a short time span.

The term "matching" can be understood in the sense of evaluating a correspondence between the sensor data samples and the one or more elements. In principle, since each transformed element has an uncertainty with respect to the true characteristics due to an inaccurate position estimate for determining the predefined map, the sensor data samples—as a ground truth—can be used to find a location with an increased certainty (i.e., the sensor data samples are used to reduce the uncertainty with respect to transformed elements). In particular, the matching can be a registration process, for example an image registration.

The position of the vehicle is determined on the basis of the matching. This is to say that the correspondence between the sensor data samples and the transformed elements is exploited for determining the position. In general, the position can be determined from any appropriate sensor measurement or a combination thereof. The combination proposed here, namely sensor data samples and transformed elements, can be sufficient to determine the position. The matching allows increasing the accuracy of the position determination. Beyond sensor data samples and the elements of the predefined map, additional sensor measurements can be used for determining the position, e.g., from one or more additional sensors of the vehicle.

Preferably, the position of the vehicle comprises coordinates, which represent a location of the vehicle with respect to a coordinate system. Furthermore, the position can comprise an angle of the vehicle representing a heading, i.e. an orientation of the vehicle with respect to a reference heading.

According to an embodiment, the method can be implemented in a vehicle in order to provide one or more autonomous-driving applications requiring accurate information about a current position of the vehicle. This is to say that the driving behaviour of the vehicle (i.e. "the vehicle") is controlled or modified with respect to the determined position of the vehicle.

According to an embodiment the sensor data representation is a native data representation of the sensor and/or wherein the plurality of sensor data samples form raw sensor data of the sensor. Processing overhead for determining data, which is derived from the raw data, such as radar detection points, can thus be avoided.

According to an embodiment the first component represents a radial distance between the sensor and the vicinity of the vehicle, and wherein the second component represents a rate of change, in particular velocity, of the radial distance between the sensor and the vicinity of the vehicle (radial velocity), wherein the sensor data representation preferably does not comprise a component representing an angle information. The first and second component can be directly obtained per sensor data sample when using a radar system for example. An angle, which is usually part of any radar detection point, does not need to be evaluated and the corresponding processing overhead can be saved.

According to an embodiment the sensor comprises a Doppler sensor, in particular a radar sensor and/or a LiDAR (light detection and ranging) sensor. As another alternative, a vision sensor, for example a camera can be used for obtaining sensor data samples in the sensor data representation. The term Doppler sensor indicates that it the sensor is configured to obtain sensor data samples directly in the sensor data representation. Determining the sensor data samples can nevertheless require some data processing, but it is deemed to be much less than for determining proper detection points with a full spatial representation in two dimensions. For example, processing an emitted radar signal and a received radar signal in order to determine the distance and the rate of change of the distance is much less complex than determining angle information from the sensor data of a radar sensor.

According to an embodiment the sensor, in particular when being configured as a radar sensor, comprises only a single receiver, in particular a single antenna. This is in contrast to usual radar sensors comprising multiple antennas in order to allow angle information to be determined from the corresponding sensor data. However, since angle information is preferably not determined in the method described herein, a single antenna or receiver sensor is sufficient and hardware costs of the sensor can be significantly reduced.

According to an embodiment transforming the at least one element comprises using a predefined transformation rule, the transformation rule being adapted to receive the at least one element of the predefined map and velocity information of the sensor and/or the vehicle and to output the at least one element of the transformed map in the sensor data representation in response. Additionally, the predefined transformation rule can receive an initial estimate of the position of the vehicle, for example based on motion sensors of the vehicle (odometry) or GPS.

According to an embodiment the plurality of coordinates of the map data representation are associated with a Cartesian coordinate system or a Polar coordinate system. Other spatial coordinate systems can also be adopted.

According to an embodiment the at least one element represents a pole object, in particular stationary road equipment, for example a street lamp pole or a traffic sign pole. Good results can be achieved with pole objects. However, other types are also possible.

According to an embodiment the method further comprises determining a subset of the sensor data samples on the basis of the at least one element of the transformed map. In this way, the amount of data is significantly reduced to a portion, which is likely to correlate with the elements of the map.

According to an embodiment determining the subset of the sensor data samples is carried out by using a predefined classification rule, in particular a machine-learning based classification rule, for example on the basis of an artificial neural network. Additionally or alternatively, signal processing approaches like filtering of the sensor data samples can be used to determine the subset.

According to an embodiment the method further comprises determining a subset of the sensor data samples to be matched, wherein the following steps are carried out for at least some of the sensor data samples: identifying, from the plurality of sensor data samples, a sensor data sample having maximum similarity with the at least one element of the transformed map; and assigning the identified sensor data sample to the at least one element of the transformed map. The similarity with the at least one element can be determined for at least some, in particular all of the sensor data samples. The similarity can be determined by evaluating a similarity measure, which can be a distance measure, for example an Euclidean distance measure. The distance measure represents the difference between the first and second components of the respective sensor data sample and the respective element.

According to an embodiment identifying the sensor data sample comprises: determining candidate sensor data samples from the plurality of sensor data samples, wherein each of the candidate sensor data samples is located in a predefined neighbourhood of the at least one element of the transformed map, the predefined neighbourhood being defined with respect to the first component and the second component of the sensor data representation; determining, for each candidate sensor data sample, a difference between the candidate sensor data sample and the at least one element of the transformed map; and selecting the sensor data sample having the minimum difference. In this way, maximum similarity corresponds with a minimal difference. The difference can be determined as the Euclidean distance with respect to the first and second component, as also mentioned before.

According to an embodiment the matching comprises determining a rigid transformation function by minimizing a difference between the at least one element and the assigned sensor data sample, wherein one of the element and the assigned sensor data sample is transformed by means of the rigid transformation function. Preferably, the at least one element of the transformed map is transformed by the rigid transformation function, i.e. the element is matched to the respective data sample.

According to an embodiment the method further comprises determining a preliminary position of the vehicle, and wherein determining the position of the vehicle comprises transforming the preliminary position by means of the rigid transformation function.

According to an embodiment the method further comprises determining the position, in particular the preliminary position, on the basis of a motion model of the vehicle, wherein the motion model is determined on the basis of at least one measurement from at least one motion sensor of the vehicle and/or on the basis of at least some of the plurality of data samples of the at least one scan. The motion model can be a model which describes the trajectory of the vehicle over time. The model can be initialized with some value and is then periodically updated based on motion measurements of the vehicle. In this regard, the motion model is preferably determined on the basis of at least one measurement from at least one motion sensor of the vehicle and/or on the basis of at least some of the sensor data samples. The combination of measurements from a motion sensor and a radar system can further enhance the accuracy of the method. As an alternative to using a motion model a suitable localization system can be used, for example on the basis of a DGPS (Differential Global Positioning System).

The measurement from the at least one motion sensor can comprise a velocity and/or a yaw rate of the vehicle, wherein the vehicle preferably comprises corresponding sensor facilities. This is also known as "dead-reckoning" measurements. Preferably, the velocity and/or the yaw rate of the vehicle is determined on the basis of wheel-speed-sensor (wheel rotation per time span) measurements and/or yaw-rate-sensor measurements. Dead-reckoning measurements taken alone have been found to provide inaccurate estimations of the vehicle position under certain conditions, e.g., during strong steering maneuvres. For this reason, the estimation based on dead-reckoning can represent a preliminary estimation of the vehicle's position.

The position of the vehicle can comprise coordinates representing a location and an orientation of the vehicle.

In another aspect, the present disclosure is directed at a computer system, said computer system being configured to carry out several or all steps of the computer implemented method described herein. The computer system can be connected or connectable to a sensor or sensor system of a vehicle, wherein the sensor or sensor system can be configured to perform at least the method step of capturing the at least one scan with the sensor data samples given in the sensor data representation. The sensor can be part of a sensor unit, which can be a radar sensor unit or a LiDAR sensor unit.

The computer system can be configured to perform other method steps disclosed herein, in particular determining the predefined map, transforming the map, matching and/or determining the position. Related method steps can also be performed by the computer system. The computer system can also be connected or connectable to motion sensors of the vehicle or to a localization system in order to determine a preliminary position of the vehicle, for example by using a motion model of the vehicle. The computer system can be formed or can be part of a computing unit or system of the vehicle, for example an electronic control unit (ECU) of the vehicle.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a vehicle equipped with a sensor system, wherein the sensor system is adapted to receive electromagnetic radiation emitted from at least one emitter of the sensor system and reflected in a vicinity of the vehicle towards the sensor system, and a computer system for determining a position of the vehicle on the basis of the emitted and the reflected radiation.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

DRAWINGS

Figure 2:
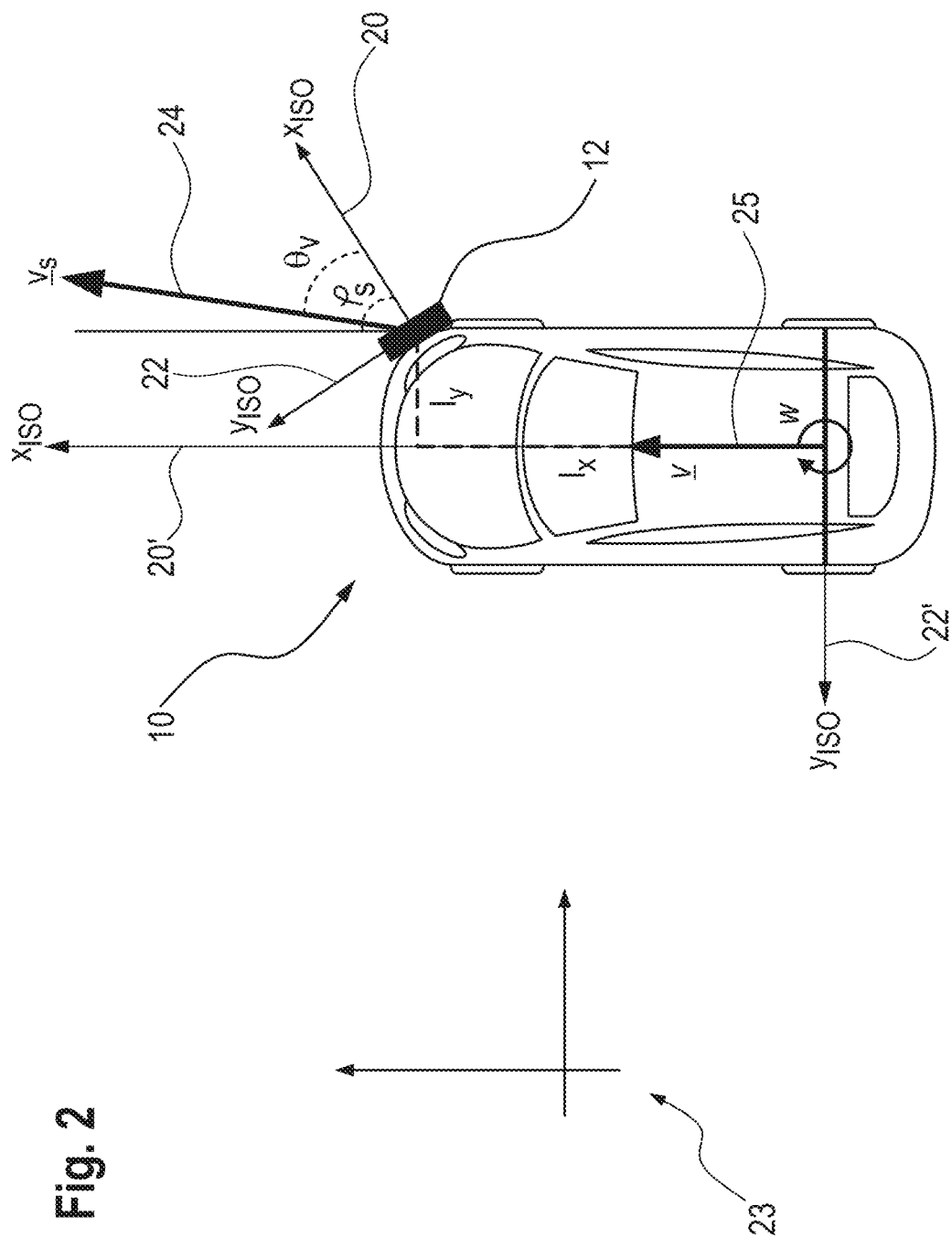
Figure 3:
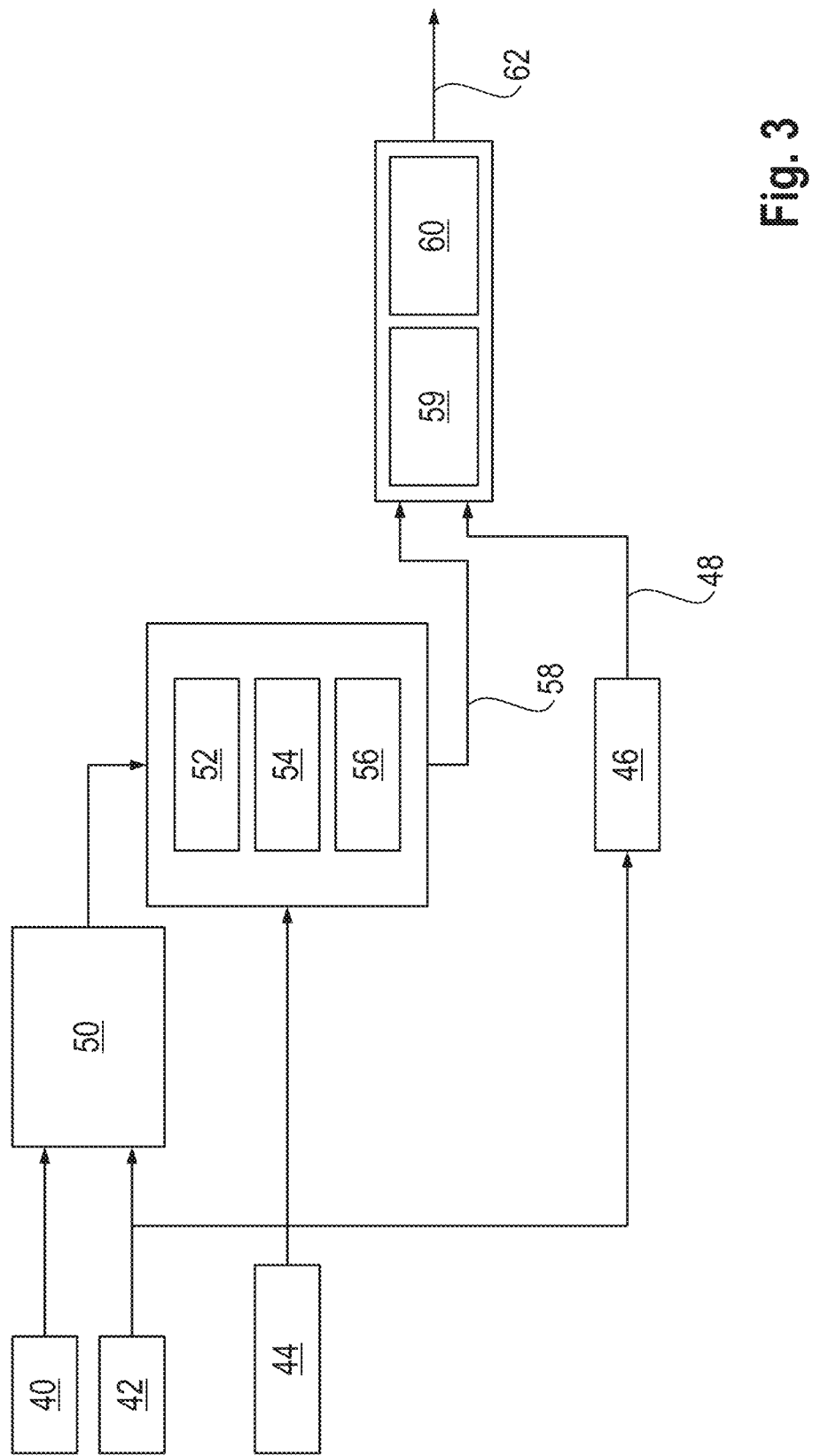
Figure 4:
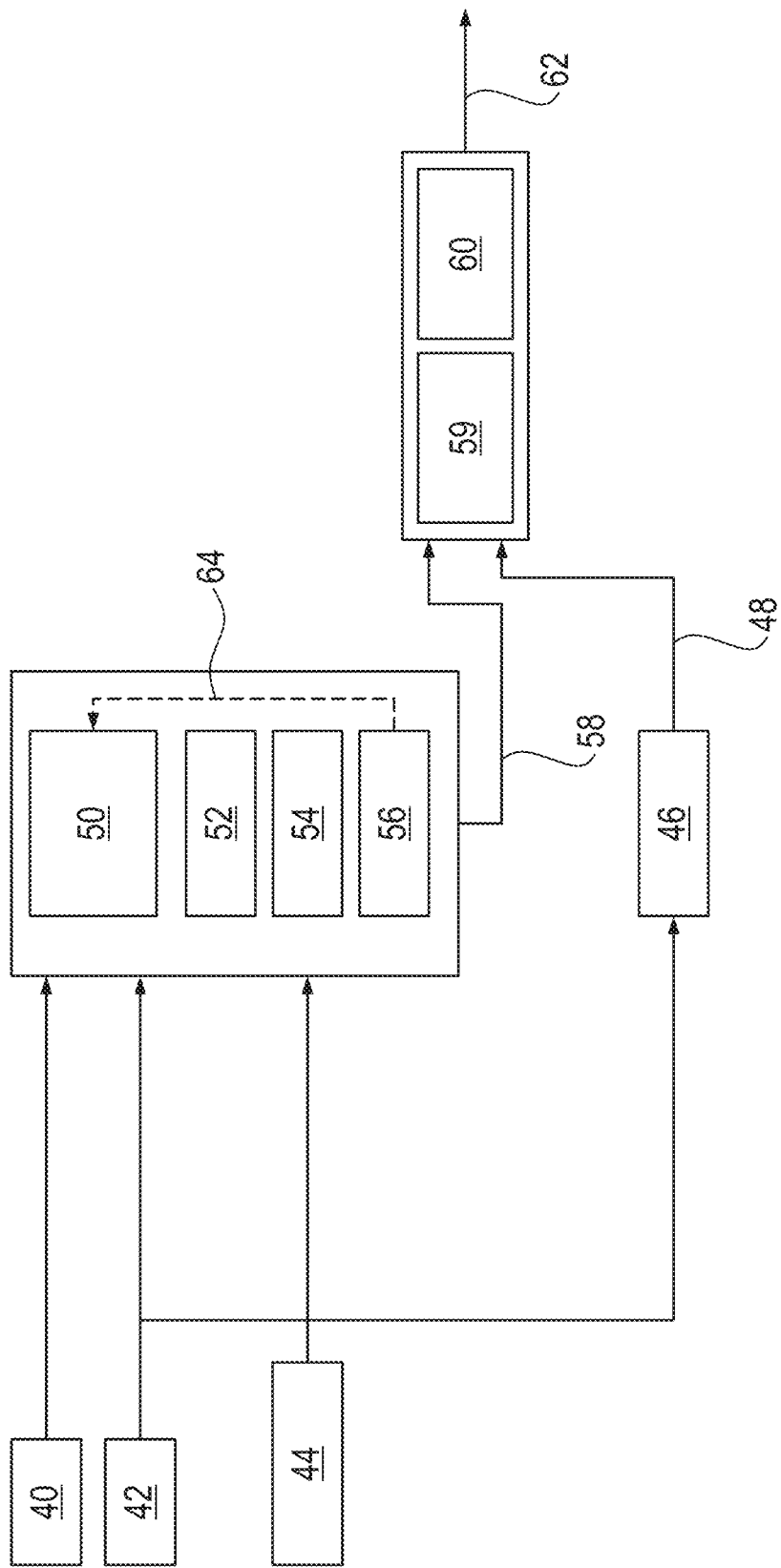
Figure 5:
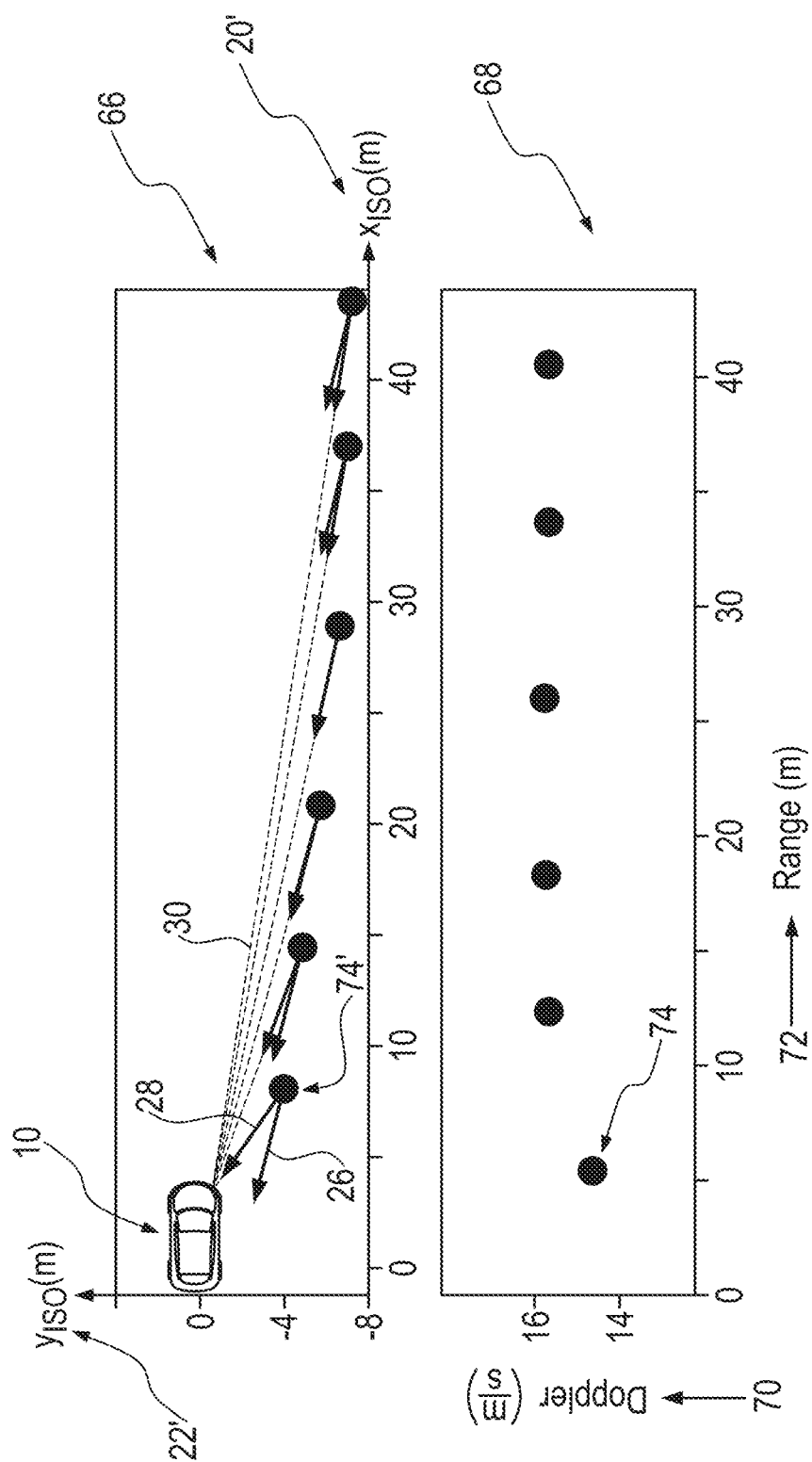
Figure 6:
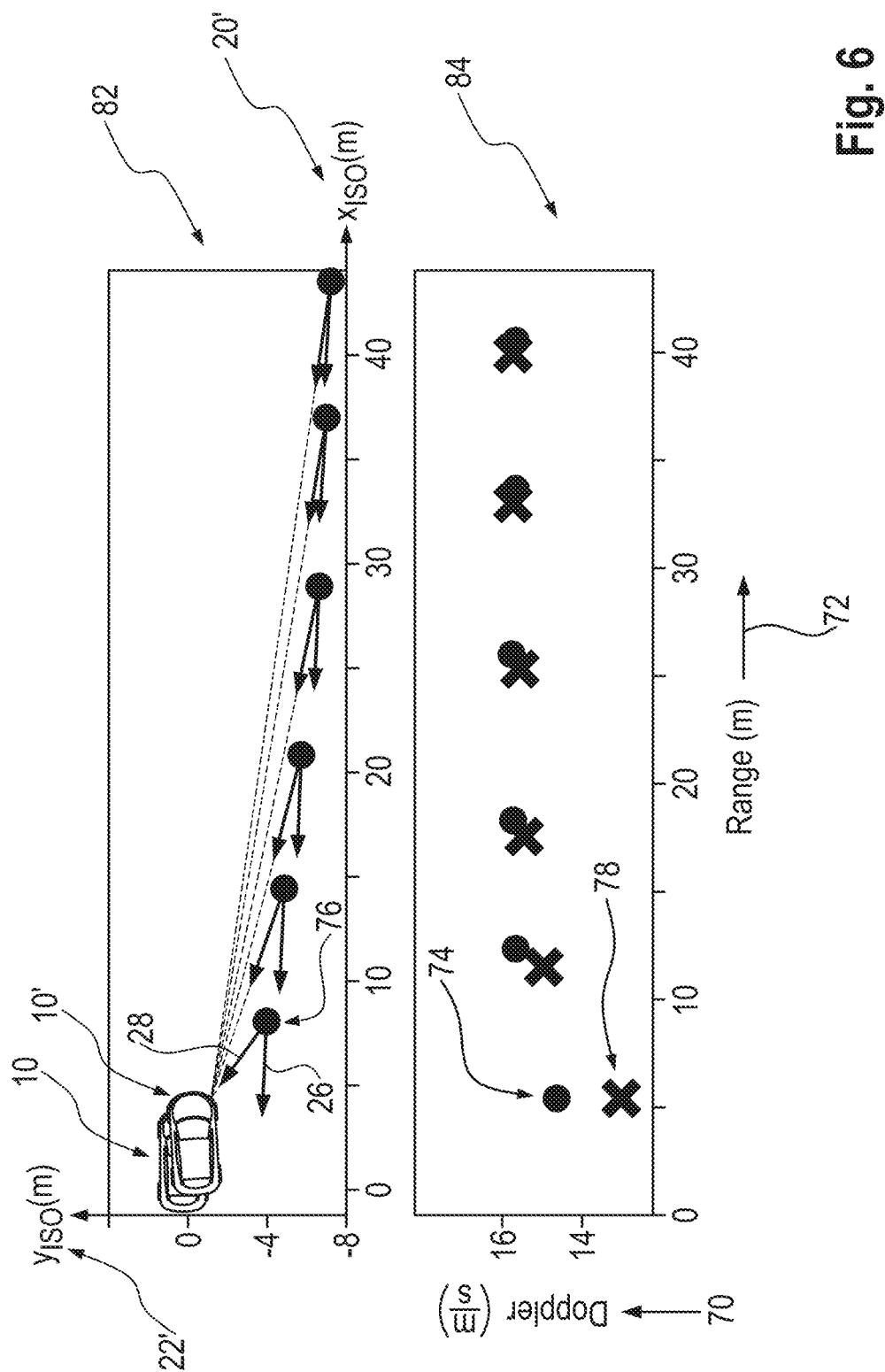
Figure 7:
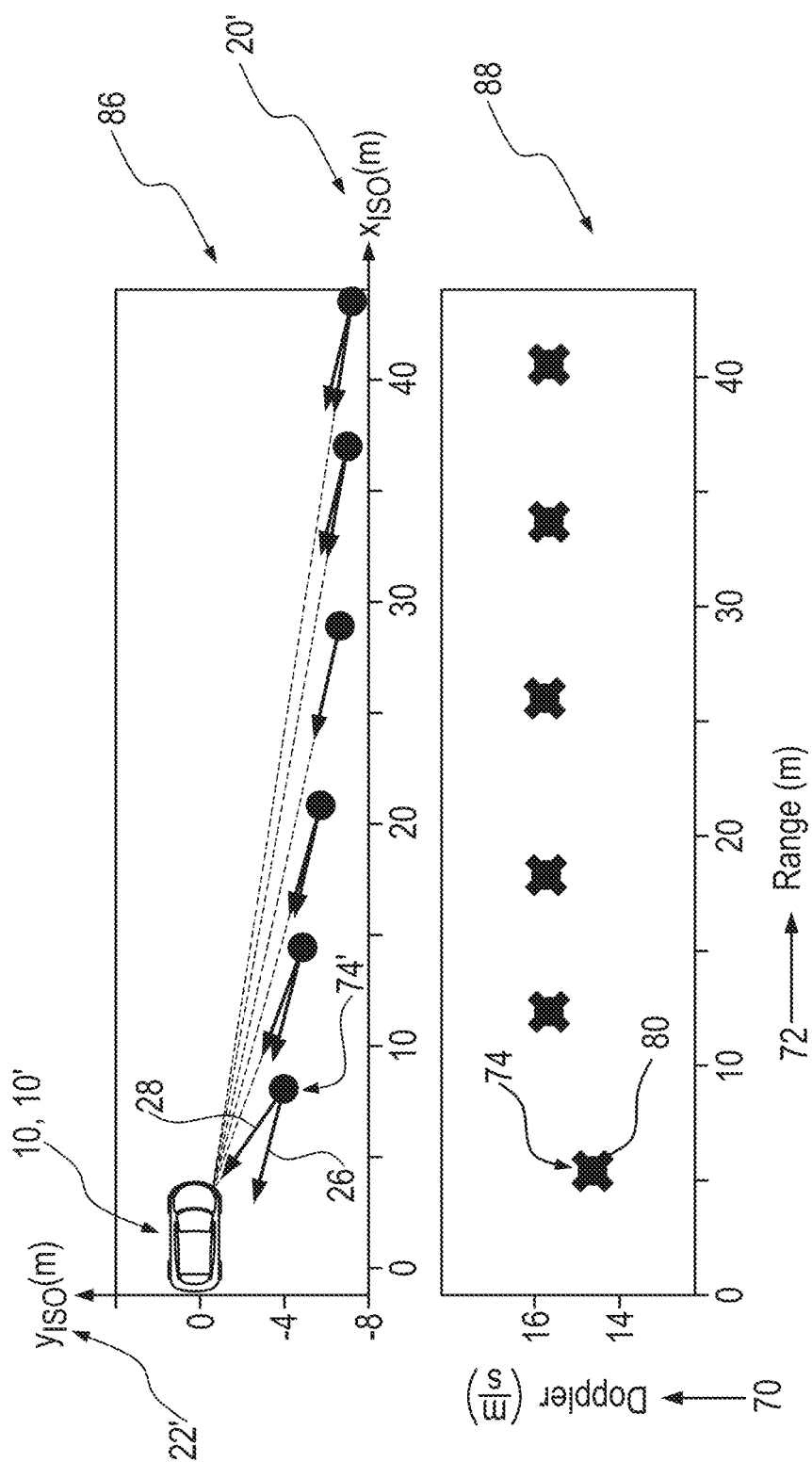

Exemplary embodiments and functions of the present disclosure are described herein in conjunction with the following drawings, showing schematically:

FIG. 1 a vehicle equipped with a sensor for determining scans of the vicinity of the vehicle;

FIG. 2 the vehicle from FIG. 1 illustrating aspects of transforming elements of a map to a sensor data representation;

FIG. 3 a block diagram of a method for determining a position of a vehicle equipped with a sensor;

FIG. 4 a block diagram of a method for determining a position of a vehicle equipped with a plurality of sensors;

FIG. 5 diagrams for illustrating sensor data samples in a map data representation and a sensor data representation;

FIG. 6 the diagrams from FIG. 5 in an overlay with diagrams for illustrating elements of a predefined map; and FIG. 7 the diagrams from FIG. 6, wherein the elements of the predefined map are matched to the sensor data samples.

DETAILED DESCRIPTION

In the figures, the same reference numerals are used for corresponding parts. FIG. 1 depicts a vehicle 10, wherein a Doppler sensor 12 is mounted at the left side of the front bumper of the vehicle 10. The Doppler sensor 12 is configured as a radar sensor with a field of view indicated by reference numeral 14. The sensor 12 is configured to determine scans of the vicinity 16, wherein a plurality of poles 18 are located in the vicinity 16. The sensor 12 has a range, which is suitable to detect each of the poles 18 within the field of view 14, as will be explained in more detail.

The sensor 12 moves with a sensor velocity 24 ($v_s$), which is due to a movement of the vehicle 10 at which the sensor 12 is mounted. In contrast, the poles 18 are all stationary and represent for example stationary road equipment objects such as traffic lights or the like. The sensor velocity 24 can be described with respect to an x-coordinate dimension 20 ($x_{ISO}$) and a y-coordinate dimension 22 ($y_{ISO}$), which form a coordinate system of the sensor 12, as indicated in FIG. 1. The sensor velocity 24 can be split up into portions $v_x$ and $v_y$ of the dimensions 20 and 22. Due to the movement of the sensor 12 with the sensor velocity 24 the poles 18 can be considered to move with an inverse sensor velocity 26, which is indicated as corresponding vector arrows originating from the poles 18, cf. FIG. 1. This interpretation results if one assumes that the sensor 12 is stationary, i.e. the relative movement between the sensor 12 and the poles 18 is assigned to the poles 18 rather than to the sensor 12.

The sensor 12 is configured to determine sensor data samples, wherein each of the sensor data samples has a first component and a second component. These components are illustrated in FIG. 1 for each of the poles 18, which are considered to produce a corresponding sensor data sample for each of the poles 18. The first component is radial distance 30 and the second component is radial velocity 28, which is the rate of change of the distance 30. As shown in FIG. 1 the radial distance 30 corresponds to the minimum distance between the sensor 12 (the origin of the sensor coordinate system or another reference point of the sensor) and a respective pole 18, wherein the distance 30 is indicated as dashed line. The radial velocity 28 is indicated in FIG. 1 as an arrow extending from the pole 18 towards the direction of the radial velocity 28. The length of the arrow indicates the magnitude of the velocity 28. It is understood from FIG. 1 that as the angle θ between the distance 30 and the sensor-velocity vector 24 increases the difference between the radial velocity 28 and the inverse sensor velocity 26 increases. This makes clear that radial velocity 28 is a measured velocity from the perspective of the sensor 12 and it can happen that the radial velocity 28 is close to zero despite a significant sensor velocity 24. It is understood that the scan comprises many more sensor data samples from the vicinity 16, wherein not each sensor data sample represents a pole as indicated in FIG. 1. This means that the scan can comprise data samples, which represent background characteristics of the vicinity 16.

The poles 18 from FIG. 1 are represented by elements of a predefined map of the vicinity 16 (not explicitly shown). The elements from a-priori information and are given in a map data representation, which is based on a Cartesian coordinate system, for example with a x-coordinate dimension and a y-coordinate dimension in orthogonal relation to each other, which may be denoted as a world or map coordinate system 23, see FIG. 2. In order to make use of the elements of the predefined map the elements are transformed from the map data representation to the sensor data representation. As indicated above, the sensor data representation comprises two components representing radial distance 30 and radial velocity 28. In contrast, the map data representation has spatial coordinate dimensions, in particular Cartesian coordinate dimensions. The elements are transformed on the basis of a current estimated vehicle position and motion information of the vehicle 10. This is done by using a predefined transformation rule, which is further illustrated in FIG. 2. As can be seen a coordinate system with an x-coordinate dimension 20' and a y-coordinate dimension 22' is placed with its origin in the middle of the rear axis of the vehicle 10. The position of the vehicle 10 is assumed to be known with respect to to the world or map coordinate system 23, which is the same spatial domain as for the elements of the predefined map. By means of one or more motion sensors of the vehicle 10 (not shown) the vehicle velocity v and the yaw rate w are measured with respect to the vehicle coordinate system defined by the dimensions 20', 22', cf. FIG. 2. Furthermore, the x-coordinate $l_x$ and the y-coordinate $l_y$ of the position of the sensor 12 with respect to the dimensions 20' and 22' are known. Additionally, the mounting angle $\varphi_s$ is known. With this information each of the elements of the predefined map can be readily transformed into the sensor data representation. In this way, transformed elements are described by means of the radial distance 30 and a radial velocity 28, as indicated in FIG. 1. The transformed elements can now be processed together with the actual sensor data, i.e. the sensor data samples, wherein the transformed elements and the actual sensor data are both given in the sensor data representation. In this way, a complex processing of the sensor data samples can be avoided.

A method for determining a position of a vehicle is described with respect to FIG. 3. The method starts with blocks 40, 42 and 44. Block 40 represents determining the predefined map comprising a plurality of elements, wherein each of the elements represents a static landmark in the vicinity of the vehicle, for example the poles 18 in the vicinity 16 of the vehicle 10, as shown in FIG. 1. The elements are given in a map data representation, as discussed in view of FIG. 1 and FIG. 2. Block 42 represents determining the vehicle motion, for example the velocity v and the yaw rate w, wherein motion sensors of the vehicle are used, as discussed in connection with FIG. 2. Block 44 represents determining at least one scan of the vehicle's vicinity, wherein the scan comprises a plurality of sensor data samples given in the sensor data representation, as discussed in connection with FIG. 1. The vehicle motion parameters obtained from block 42 are fed into block 46, which represent a motion model or another localization system (e.g., DGPS) of the vehicle. The motion model is used to determine a preliminary position 48 of the vehicle, which is assumed to be inaccurate with respect to the true position of the vehicle. In order to obtain a more precise or final position of the vehicle the following steps are carried out. The predefined map from block 40 and the vehicle motion parameters from block 42 are fed into block 50, which represents transforming the elements of the map into the sensor data representation, as discussed in connection with FIG. 2. The transformed elements can be considered to represent a simulated map because the elements are transformed into virtual sensor data samples. The method steps of blocks 52, 54, and 56 are carried out on the basis of the transformed elements from block 50 and the true sensor data samples from block 44.

In block 52, the most similar sensor data sample from block 44 is identified for each of the transformed elements from block 50. This may be done by identifying candidate sensor data samples from block 44 within a neighbourhood of a respective transformed element, wherein the candidate sensor data sample having a minimum difference with the element is selected as the most similar sensor data sample. The neigbourhood is defined by fixed thresholds for each of the first and second component of the sensor data representation. For example, when a respective element has component values (de, ye) the neigbourhood can be defined by intervals [de−d1, de+d1] for the first component and [ve−v1, ve+v1] for the second component. In block 54, the most similar sensor data sample from block 44 is assigned to the respective transformed element from block 50. The steps of blocks 52 and 54 are carried out for each of the transformed elements from block 50. As the case may be, no candidate sensor data samples are found for a respective element. These elements are not considered further for following processing steps. It is understood that the sensor data samples, which have been assigned to a respective element in block 54, form a subset of all sensor data samples from block 44. In block 56, a rigid transformation function is determined by minimizing a cost function that describes the mismatch between the transformed elements from block 50 and the assigned sensor data samples. The cost function involves transforming the transformed elements from block 50 by means of the rigid transformation function, wherein the rigid transformation function comprises a transformation parameter for the first component of the sensor data representation and another transformation parameter for the second component of the sensor data representation. An optimum set of transformation parameters 58 is then found, which minimizes the mismatch between the transformed elements of the predefined map and the assigned sensor data samples. The transformation parameters 58 are transformed into the map data representation in block 59, which may comprise parameters for translation in x and y dimensions and an angle for rotation. Afterwards, the preliminary position 48 is transformed by means of the transformation parameters 58 of the rigid transformation function given in the map data representation. The resulting final position of the vehicle 62 is then considered to be more accurate than the preliminary position 48.

The block diagram of FIG. 4 illustrates an extension of the method described in view of FIG. 3, namely the use of a plurality of sensors mounted at the same vehicle. In this case, a loop 64 is implemented, wherein the method steps described in connection with blocks 50, 52, 54, and 56 are carried out for each of the plurality of sensors. The determination of the rigid transformation function in block 56 takes into account the mismatch between the transformed elements for each of the sensors and the corresponding assigned sensor data samples. In this way, the parameters of the rigid transformation function 58 can be considered to be even more accurate so that the accuracy of the determined position 62 can be further increased in the sense of fusing the data of the plurality of sensors.

The principle of the methods for determining the position 62 is illustrated further with respect to FIGS. 5, 6, and 7. FIG. 5 comprises two diagrams 66 and 68. Diagram 68 comprises a plurality of sensor data samples 74 given in the sensor data representation, which comprises a first component, namely a distance velocity component 70 (Doppler), and a second component, namely distance component 72. It is understood that the component 72 represents a radial distance 30 illustrated in FIG. 1. Likewise, component 70 represents a radial velocity 28 as also shown in FIG. 1. The sensor data samples 74 represent the poles 18 from FIG. 1 as perceived by the sensor 12, wherein for further illustration corresponding sensor data samples 74' are shown in the map data representation in diagram 66 in FIG. 5. For illustrating purposes vehicle 10 is also shown in diagram 66. The units shown in the diagram 66 and 68 (m=meter, s=second) and also in the further diagrams to be discussed are merely exemplary and other units or ranges are possible. The x-coordinate dimension 20' and the y-coordinate dimension 22' of diagram 66 correspond to the dimensions shown in FIG. 2 with respect to the vehicle 10.

FIG. 6 comprises diagrams 82 and 84, which generally correspond to diagrams 66 and 68 from FIG. 5. However, diagram 84 comprises transformed elements 78, which represent the poles 18 as elements from the predefined map in the sensor data representation. The untransformed elements 76 are plotted in diagram 82, i.e. with respect to the dimensions 20' and 22', wherein inverse velocity vectors 26 and radial velocity vectors 28 are shown for illustrative purposes. As can also be seen in diagram 82 a vehicle 10' is shown in overlay with the vehicle 10 from FIG. 5, wherein the position of vehicle 10' corresponds to the inaccurate position 48 discussed in connection with FIG. 3 and FIG. 4. As can be seen from diagram 84 a mismatch between vehicle 10 and the vehicle 10' corresponds to the mismatch of the sensor data samples 74 and the transformed elements 78. It is noted that the point-like nature of the sensor data samples 74 in FIG. 6 does not necessarily correspond to the true shape of the sensor data. In particular, the sensor data sample 74 can be blurred or spread along one or both of the components 70 and 72. Additionally, a plurality of sensor data samples 74 can be located around each of the transformed elements 78, which are indicated as crosses in diagram 84 of FIG. 6. However, diagram 84 shows a situation, wherein the most similar sensor data sample 74 has already been assigned to the nearest elements 78, which corresponds to the outcome of block 54 in FIG. 3 and FIG. 4. The rigid transformation function is then determined by minimizing a difference or mismatch between the sensor data samples 74 and the transformed elements 78 with the optimum parameter set 58 for the rigid transformation function.

The result of the matching is further understood when considering FIG. 7, which shows diagrams 86 and 88 that generally correspond to diagrams 82 and 84 from FIG. 6 after the matching. This is to say that the elements 78 from diagram 84 are transformed with the optimum parameter set 58 by means of the rigid transformation function. As a result, there is no mismatch anymore between the sensor data samples 74 and the matched elements 80. Having regard to diagram 86, it can be seen that there is no mismatch between vehicles 10 and 10'. This means that the position of vehicle 10', which corresponds to the inaccurate position 48, has been transformed with the optimum parameter set 58 by means of the rigid transformation function.

The processing effort required for carrying out the described method is much lower than with conventional methods, which involve transforming the sensor data samples 74 provided by the sensor 12 into a full spatial representation, for example with respect to the x-coordinate dimension 20' and the y-coordinate dimension 22'. This is because the sensor 12 provides huge amounts of data samples. In contrast, the number of elements 76 of the predefined map is much lower and therefore the processing effort for transforming these elements from the map data representation into the sensor data representation is much lower.

What is claimed is:

1. A computer-implemented method for determining a position of a vehicle, wherein the vehicle is equipped with a sensor for capturing scans of a vicinity of the vehicle, wherein the method comprises at least the following steps carried out by computer-hardware components:
capturing at least one scan by means of the sensor, wherein the at least one scan represents the vicinity of the vehicle and comprises a plurality of sensor data samples given in a sensor data representation, wherein the sensor data representation comprises a first component and a second component, the first component representing a distance between the sensor and the vicinity of the vehicle, and the second component representing a rate of change of the distance between the sensor and the vicinity of the vehicle;
determining, from a database, a predefined map, wherein the predefined map represents the vicinity of the vehicle and comprises at least one element representing a static landmark, wherein the at least one element is given in a map data representation comprising a plurality of coordinates, wherein the coordinates represent position information of the static landmark;
determining a transformed map by transforming the at least one element of the predefined map from the map data representation into the sensor data representation;
matching at least a subset of the sensor data samples of the at least one scan and the at least one element of the transformed map; and
determining the position of the vehicle based on the matching.

2. The method of claim 1, wherein at least one of:
the sensor data representation is a native data representation of the sensor; and
the plurality of sensor data samples form raw sensor data of the sensor.

3. The method of claim 1,
wherein the first component represents a radial distance between the sensor the vicinity of the vehicle, and
wherein the second component represents a rate of change, in particular velocity, of the radial distance between the sensor and the vicinity of the vehicle.

4. The method of claim 1,
wherein the sensor comprises a Doppler sensor including at least one of: a radar sensor, a LiDAR sensor, and a camera.

5. The method of claim 1,
wherein transforming the at least one element comprises using a pre-defined transformation rule, the transformation rule being adapted to receive the at least one element of the predefined map and velocity information of the vehicle and to output the at least one element in the sensor data representation in response.

6. The method of claim 1,
wherein the at least one element represents a pole object comprising at least one of a streetlamp and a traffic sign.

7. The method of claim 1, further comprising:
determining the subset of the sensor data samples on the basis of the at least one element of the transformed map.

8. The method of claim 1,
wherein determining the subset of the sensor data samples is carried out by using a predefined classification rule comprising a machine-learning based classification rule.

9. The method of claim 1, further comprising:
determining a subset of the plurality of sensor data samples to be matched, wherein the following steps are carried out by the computer-hardware components for at least some of the sensor data samples:
identifying, from the plurality of sensor data samples, a sensor data sample having maximum similarity with the at least one element of the transformed map; and
assigning the identified sensor data sample to the at least one element of the transformed map.

10. The method of claim 9, wherein identifying the sensor data sample comprises:
determining candidate sensor data samples from the plurality of sensor data samples, wherein each of the candidate sensor data samples is located in a predefined neighborhood of the at least one element of the transformed map, the predefined neighborhood being defined with respect to the first component and the second component of the sensor data representation;
determining, for each candidate sensor data sample, a difference between the candidate sensor data sample and the at least one element of the transformed map; and
selecting the sensor data sample having a minimum difference.

11. The method of claim 9,
wherein the matching comprises determining a rigid transformation function by minimizing a difference between the at least one element of the transformed map and the assigned sensor data sample,
wherein one of the at least one elements and the assigned sensor data sample is transformed by means of the rigid transformation function.

12. The method of claim 11,
wherein the method further comprises determining a preliminary position of the vehicle, and wherein determining the position of the vehicle comprises transforming the preliminary position by means of the rigid transformation function.

13. A system comprising:
a sensor configured to capture scans of a vicinity of a vehicle; and
one or more computer-hardware components configured to:
capture at least one scan by means of the sensor, wherein the at least one scan represents the vicinity of the vehicle and comprises a plurality of sensor data samples given in a sensor data representation, wherein the sensor data representation comprises a first component and a second component, the first component representing a distance between the sensor and the vicinity of the vehicle, and the second component representing a rate of change of the distance between the sensor and the vicinity of the vehicle;
determine, from a database, a predefined map, wherein the predefined map represents the vicinity of the vehicle and comprises at least one element representing a static landmark, wherein the at least one element is given in a map data representation comprising a plurality of coordinates, wherein the coordinates represent position information of the static landmark;
determine a transformed map by transforming the at least one element of the predefined map from the map data representation into the sensor data representation;
match at least a subset of the sensor data samples of the at least one scan and the at least one element of the transformed map; and
determine the position of the vehicle based on the matching.

14. The system of claim 13, further comprising:
the vehicle, the vehicle being equipped with the sensor, wherein:
the sensor comprises a sensor system adapted to receive electro-magnetic radiation emitted from at least one emitter of the sensor system and reflected in a vicinity of the vehicle towards the sensor system; and
the position of the vehicle is determined based on the emitted and the reflected radiation.

15. A non-transitory computer readable medium comprising instructions for carrying out a computer-implemented method comprising the steps of:
capturing at least one scan by means of a sensor configured to capture scans of a vicinity of a vehicle, wherein the at least one scan represents the vicinity of the vehicle and comprises a plurality of sensor data samples given in a sensor data representation, wherein the sensor data representation comprises a first component and a second component, the first component representing a distance between the sensor and the vicinity of the vehicle, and the second component representing a rate of change of the distance between the sensor and the vicinity of the vehicle;
determining, from a database, a predefined map, wherein the predefined map represents the vicinity of the vehicle and comprises at least one element representing a static landmark, wherein the at least one element is given in a map data representation comprising a plurality of coordinates, wherein the coordinates represent position information of the static landmark;
determining a transformed map by transforming the at least one element of the predefined map from the map data representation into the sensor data representation;
matching at least a subset of the sensor data samples of the at least one scan and the at least one element of the transformed map; and
determining the position of the vehicle based on the matching.

16. The non-transitory computer readable medium of claim 15, wherein at least one of: the sensor data representation is a native data representation of the sensor and the plurality of sensor data samples form raw sensor data of the sensor.

17. The non-transitory computer readable medium of claim 15,
wherein the first component represents a radial distance between the sensor the vicinity of the vehicle, and
wherein the second component represents a rate of change, in particular velocity, of the radial distance between the sensor and the vicinity of the vehicle.

18. The non-transitory computer readable medium of claim 15,
wherein the sensor comprises a Doppler sensor including at least one of: a radar sensor, a LiDAR sensor, and a camera.

19. The non-transitory computer readable medium of claim 15,
wherein transforming the at least one element comprises using a pre-defined transformation rule, the transformation rule being adapted to receive the at least one element of the predefined map and velocity information of the vehicle and to output the at least one element in the sensor data representation in response.

20. The non-transitory computer readable medium of claim 15, further comprising:
determining the subset of the sensor data samples on the basis of the at least one element of the transformed map.

* * * * *